(12) United States Patent
Zisimopoulos

(10) Patent No.: US 10,009,953 B2
(45) Date of Patent: Jun. 26, 2018

(54) CONTROLLING DATA TRANSMISSION BETWEEN A USER EQUIPMENT AND A PACKET DATA NETWORK

(75) Inventor: Haris Zisimopoulos, London (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 987 days.

(21) Appl. No.: 14/235,434

(22) PCT Filed: Jul. 27, 2012

(86) PCT No.: PCT/KR2012/006004
§ 371 (c)(1),
(2), (4) Date: May 27, 2014

(87) PCT Pub. No.: WO2013/015647
PCT Pub. Date: Jan. 31, 2013

(65) Prior Publication Data
US 2014/0254483 A1  Sep. 11, 2014

(30) Foreign Application Priority Data

Jul. 27, 2011 (GB) .................................. 1112928.5

(51) Int. Cl.
*H04W 76/20* (2018.01)
*H04L 12/825* (2013.01)
(Continued)

(52) U.S. Cl.
CPC ........... *H04W 76/20* (2018.02); *H04L 47/266* (2013.01); *H04W 8/12* (2013.01); *H04W 76/22* (2018.02); *H04W 8/18* (2013.01); *H04W 88/16* (2013.01)

(58) Field of Classification Search
CPC .... H04L 47/266; H04W 76/04; H04W 88/16; H04W 76/041; H04W 8/12; H04W 8/18
See application file for complete search history.

(56) References Cited

U.S. PATENT DOCUMENTS 8,325,638 B2  12/2012  Jin et al.
8,711,757 B2   4/2014  Ophir et al.
(Continued)

FOREIGN PATENT DOCUMENTS

EP  2053871      4/2009
EP  2081371 A1   7/2009
(Continued)

OTHER PUBLICATIONS

International Search Report dated Jan. 30, 2013 in connection with International Patent Application No. PCT/KR2012/006004, 3 pages.
(Continued)

*Primary Examiner* — Lakeram Jangbahadur

(57) ABSTRACT

A method and apparatus are described for controlling transmission of user data between a user equipment and a packet data via a packet switched data network, such as an Evolved Packet System (EPS). An association is formed between the user equipment and one or more gateways in the packet switched data network. In some embodiments, one or more messages are sent to the user equipment indicating a capability of the one or more gateways to inhibit transmission of user data towards the user equipment; an indication is received from the user equipment to inhibit transmission of user data to the user equipment from the first gateway, and, in response, transmission of user data towards the user from at least one of the gateways is inhibited. In some embodiments, in response to receipt of an indication from the user equipment to inhibit transmission of data towards the user equipment, a message is sent to the user equipment indicating parameters defining transmission characteristics of user data that may be transmitted between at least one of the gateways and the user equipment, and the gateways control transmission of data towards the user equipment in accordance with the sent parameters. This enables transmission of (Continued)

user data between a user equipment and a packet data network to be controlled.

20 Claims, 13 Drawing Sheets

(51) Int. Cl.
H04W 8/12 (2009.01)
H04W 76/22 (2018.01)
H04W 88/16 (2009.01)
H04W 8/18 (2009.01)

(56) References Cited

U.S. PATENT DOCUMENTS

| 8,750,846 B2 | 6/2014 | Choi | |
|---|---|---|---|
| 2006/0104284 A1 | 5/2006 | Chen | |
| 2008/0098463 A1 | 4/2008 | Wikman | |
| 2009/0047947 A1* | 2/2009 | Giaretta | H04W 48/17 455/432.1 |
| 2009/0103541 A1 | 4/2009 | Lin | |
| 2009/0176496 A1* | 7/2009 | Li | H04L 12/5695 455/437 |
| 2009/0286481 A1 | 11/2009 | Abraham et al. | |
| 2010/0142373 A1* | 6/2010 | Jin | H04L 12/14 370/230 |
| 2010/0173611 A1* | 7/2010 | Choi | H04L 63/102 455/411 |
| 2011/0022504 A1 | 1/2011 | Breau et al. | |
| 2012/0264443 A1* | 10/2012 | Ng | H04W 4/005 455/450 |
| 2012/0287844 A1 | 11/2012 | Ophir et al. | |

FOREIGN PATENT DOCUMENTS

| GB | 2509845 A | 7/2014 |
|---|---|---|
| WO | WO 0223831 A1 | 3/2002 |
| WO | WO 2011080744 A1 | 7/2011 |

OTHER PUBLICATIONS

Written Opinion of International Searching Authority dated Jan. 30, 2013 in connection with International Patent Application No. PCT/KR2012/006004, 7 pages.
Extended Search Report dated May 11, 2015 in connection with European Patent Application No. 12817545.2; 11 pages.
Combined Search and Examination Report Under Sections 17 & 18(3) dated Nov. 21, 2011 in connection with United Kingdon Patent Application No. GB1112928.5; 4 pages.
Apple; "iPhone Benutzerhandbuch"; http://manuals.info.apple.com/de/iPhone_Benutzerhandbuch.pdf: Nov. 9, 2007; 174 pages.
Alla Goldner: "3GPP Traffic Detection Functionality": ICC; XP032274575; Jun. 10, 2012; 6 pages.
3GPP: "Policy and Charging Control Architecture"; 3GPP TS 23.203; V11.1.0; Mar. 17, 2011; 136 Pages.
Combined Search and Examination Report Under Sections 17 & 18(3) dated May 12, 2014 in connection with United Kingdon Patent Application No. GB1404079.4; 4 pages.

* cited by examiner

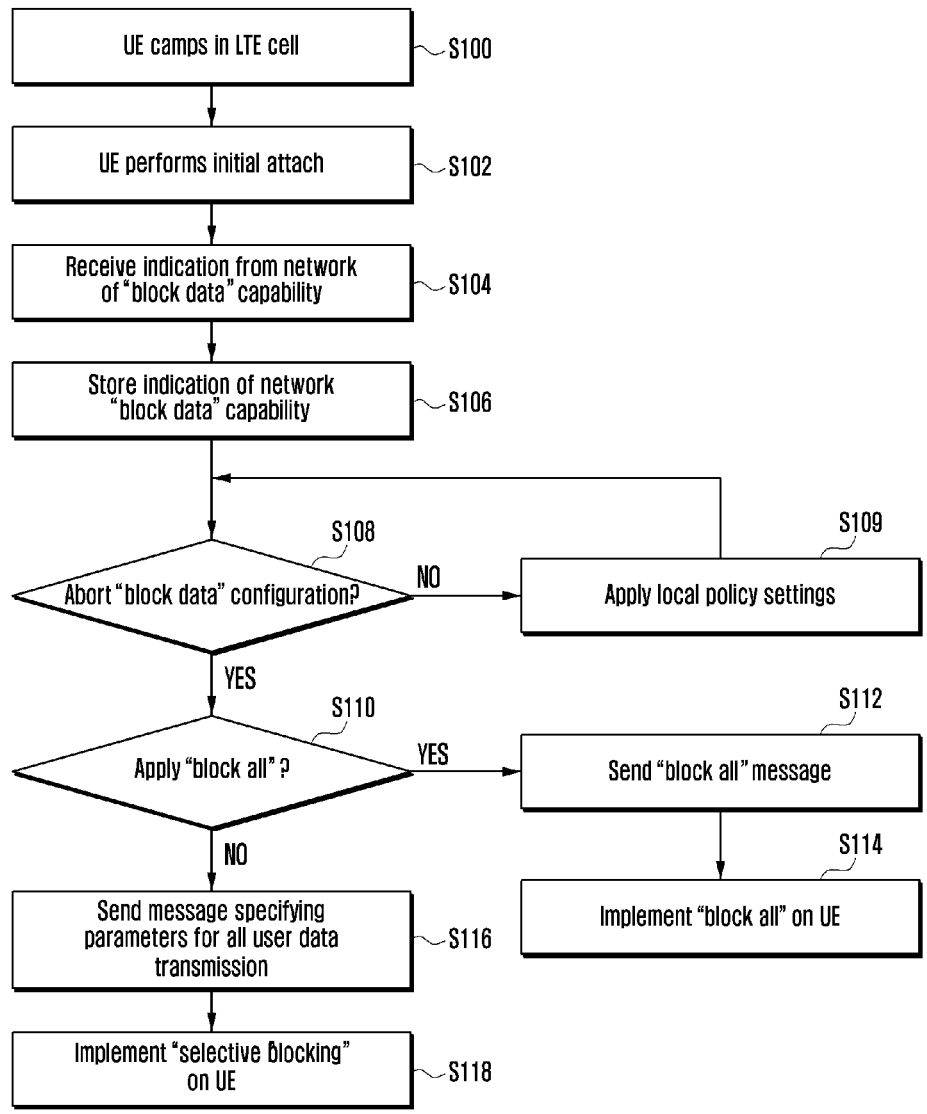

[Fig. 3]

| IEI | Information Element | Type/Reference | Presence | Format | Length |
|---|---|---|---|---|---|
| | Protocol discriminator | Protocol discriminator 9.2 | M | V | 1/2 |
| | EPS bearer identity | EPS bearer identity 9.3.2 | M | V | 1/2 |
| | Procedure transaction identity | Procedure transaction identity 9.4 | M | V | 1 |
| | Activate default EP bearer context request message identity | Message type 9.8 | M | V | 1 |
| | EPX QoS | EPS quality of service 9.9.4.3 | M | LV | 2-10 |
| | Access point name | Access point name 9.9.4.1 | M | LV | 2-101 |
| | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-18 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow identifier | Packet flow identifier 9.9.4.8 | O | TLV | 3 |
| 5E | APN-AMBR | APN aggregate maximum bit rate 9.9.4.2 | M | TLV | 4-8 |
| 58 | ESM cause | ESM cause 9.9.4.4 | O | TV | 1/2 |
| 27 | Protocol configuration options | Protocol configuration options 9.9.4.11 | O | TLV | 3-253 |

- 0001H (P-CSCF IPv6 Address);
- 0002H (IM CN Subsystem Signaling Flag);
- 0003H (DNS Server IPv6 Address);
- 0004H (Policy Control rejection code);
- 0005H (Selected Bearer Control Mode;
- 0006H (Reserved);
- 0007H (DSMIPv6 Home Agent Address) ;
- 0008H (DSMIPv6 Home Network Prefix);
- 0009H (DSMIPv6 IPv4 Home Agent Address);
- 000AH (Reserved);
- 000BH (Reserved);
- 000CH (P-CSCF IPv4 Address);
- 000DH (DNS Server IPv4 Address);
- 000EH (MSISDN);
- 000FH (IFOM-Support);
- 0010H (IPv4 Link MTU)
- XXXX (block all support); and
-- FF00H to FFFFH reserved for operator specific use.

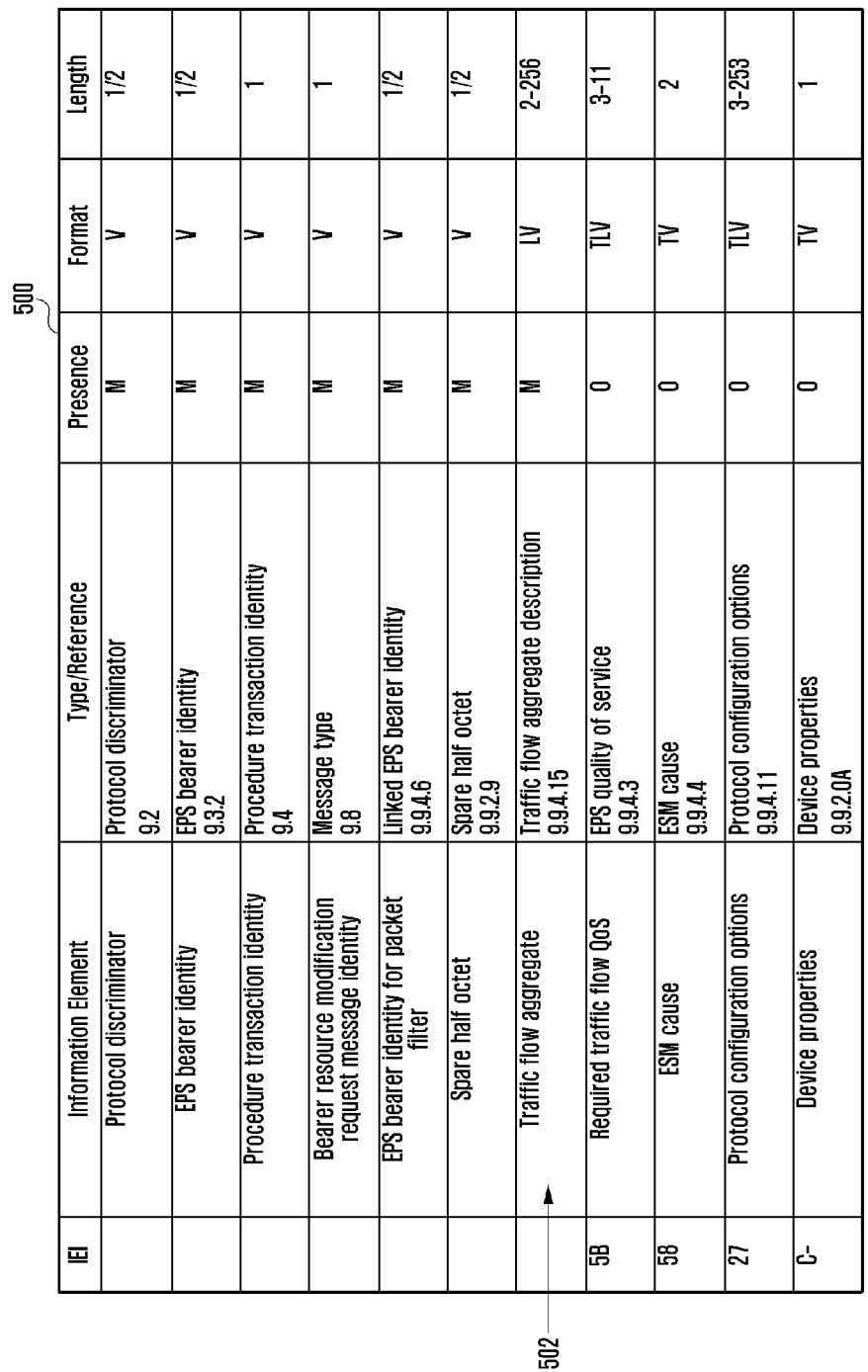

| IEI | Information Element | Type/Reference | Presence | Format | Length |
|---|---|---|---|---|---|
| | Protocol discriminator | Protocol discriminator 9.2 | M | V | 1/2 |
| | EPS bearer identity | EPS bearer identity 9.3.2 | M | V | 1/2 |
| | Procedure transaction identity | Procedure transaction identity 9.4 | M | V | 1 |
| | Bearer resource modification request message identity | Message type 9.8 | M | V | 1 |
| | EPS bearer identity for packet filter | Linked EPS bearer identity 9.9.4.6 | M | V | 1/2 |
| | Spare half octet | Spare half octet 9.9.2.9 | M | V | 1/2 |
| | Traffic flow aggregate | Traffic flow aggregate description 9.9.4.15 | M | LV | 2-256 |
| 5B | Required traffic flow QoS | EPS quality of service 9.9.4.3 | O | TLV | 3-11 |
| 58 | ESM cause | ESM cause 9.9.4.4 | O | TV | 2 |
| 27 | Protocol configuration options | Protocol configuration options 9.9.4.11 | O | TLV | 3-253 |
| C- | Device properties | Device properties 9.9.2.0A | O | TV | 1 |

[Fig. 6]
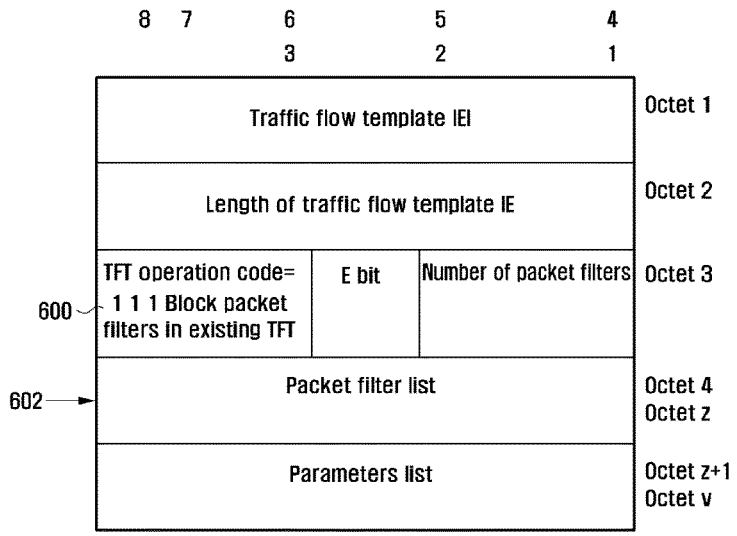
[Fig. 7]
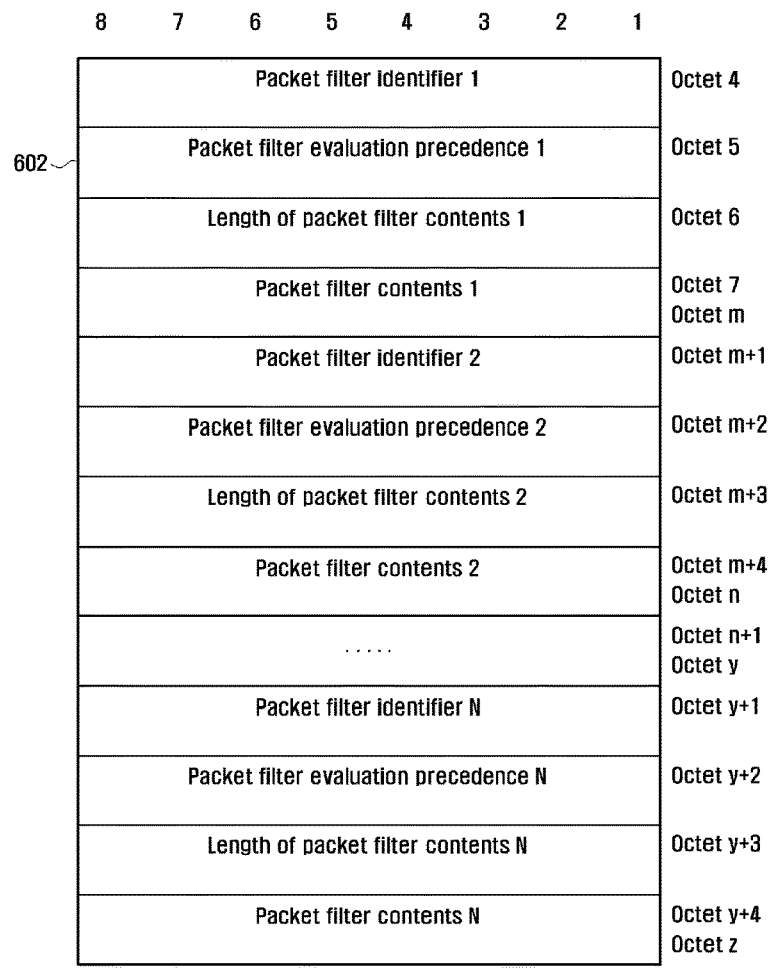

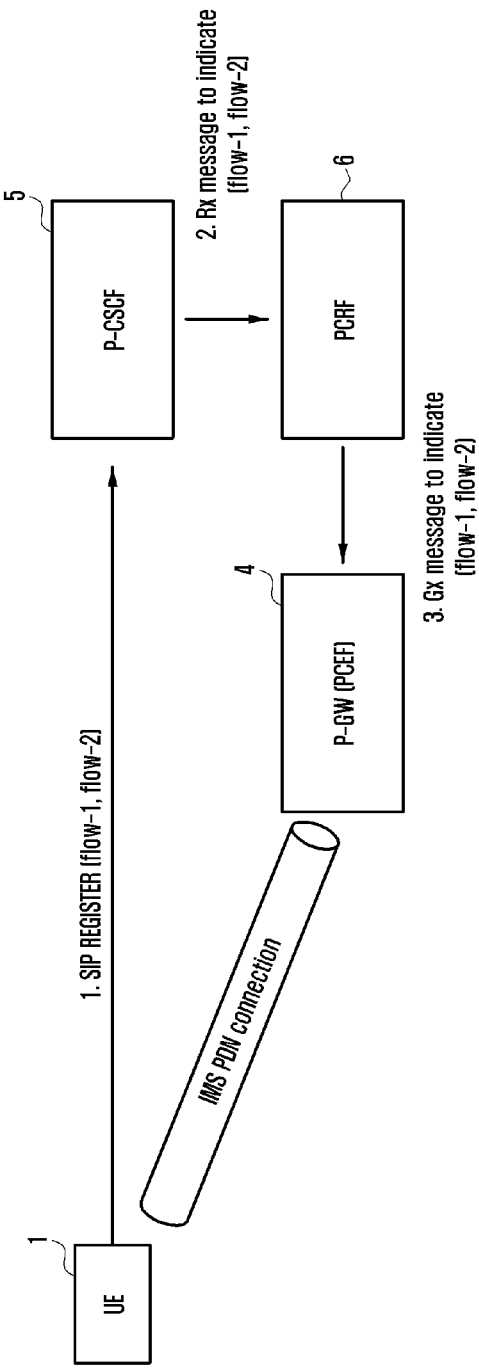
[Fig. 8]

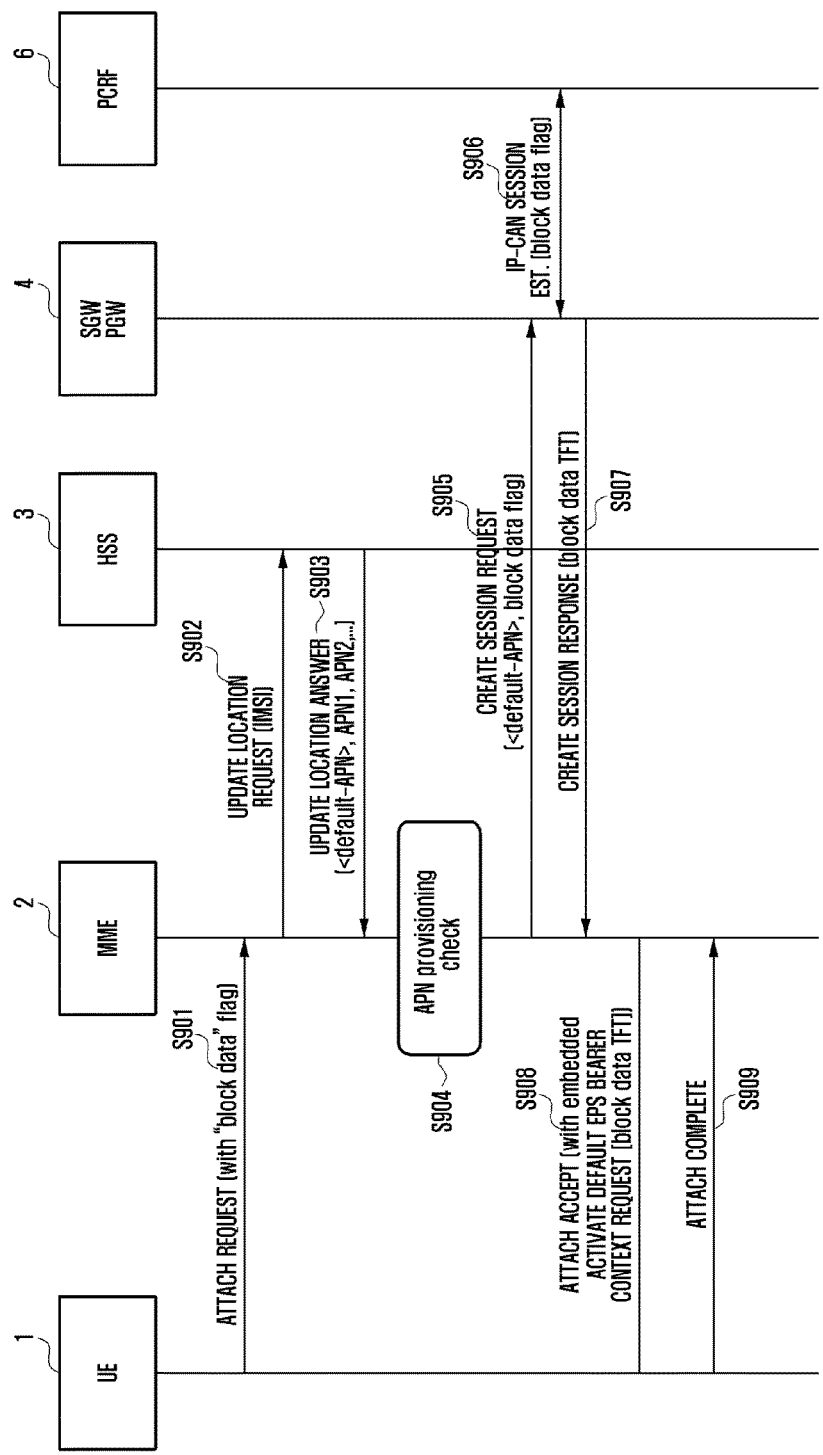
[Fig. 9]

[Fig. 10]

| IEI | Information Element | Type/Reference | Presence | Format | Length |
|---|---|---|---|---|---|
| | Protocol discriminator | Protocol discriminator 9.2 | M | V | 1/2 |
| | EPS bearer Identity | EPS bearer identity 9.3.2 | M | V | 1/2 |
| | Procedure transaction identity | Procedure transaction identity 9.4 | M | V | 1 |
| | PDN connectivity request message identity | Message type 9.8 | M | V | 1 |
| | Request type | Request type 9.9.4.14 | M | V | 1/2 |
| | PDN type | PDN type 9.9.4.10 | M | V | 1/2 |
| D- | ESM information transfer flag | ESM information transfer flag 9.9.4.5 | O | TV | 1 |
| 28 | Access point name | Access point name 9.9.4.1 | O | TLV | 3-102 |
| 27 | Protocol configuration options | Protocol configuration options 9.9.4.11 | O | TLV | 3-253 |
| C- | Device properties | Device properties 9.9.2.0A | O | TV | 1 |

| Request type value (octet 1) | |
|---|---|
| Bits | |
| 3 2 1 | |
| 0 0 1 | Initial request |
| 0 1 0 | Handover |
| x x x | Initial request with "block data" |
| 0 1 1 | Unused. If received, the network shall interpret this as "initial request" |
| 1 0 0 | emergency |
| All other values are reserved | |
| Bit 4 of octet 1 is spare and shall be coded as zero | |

1100

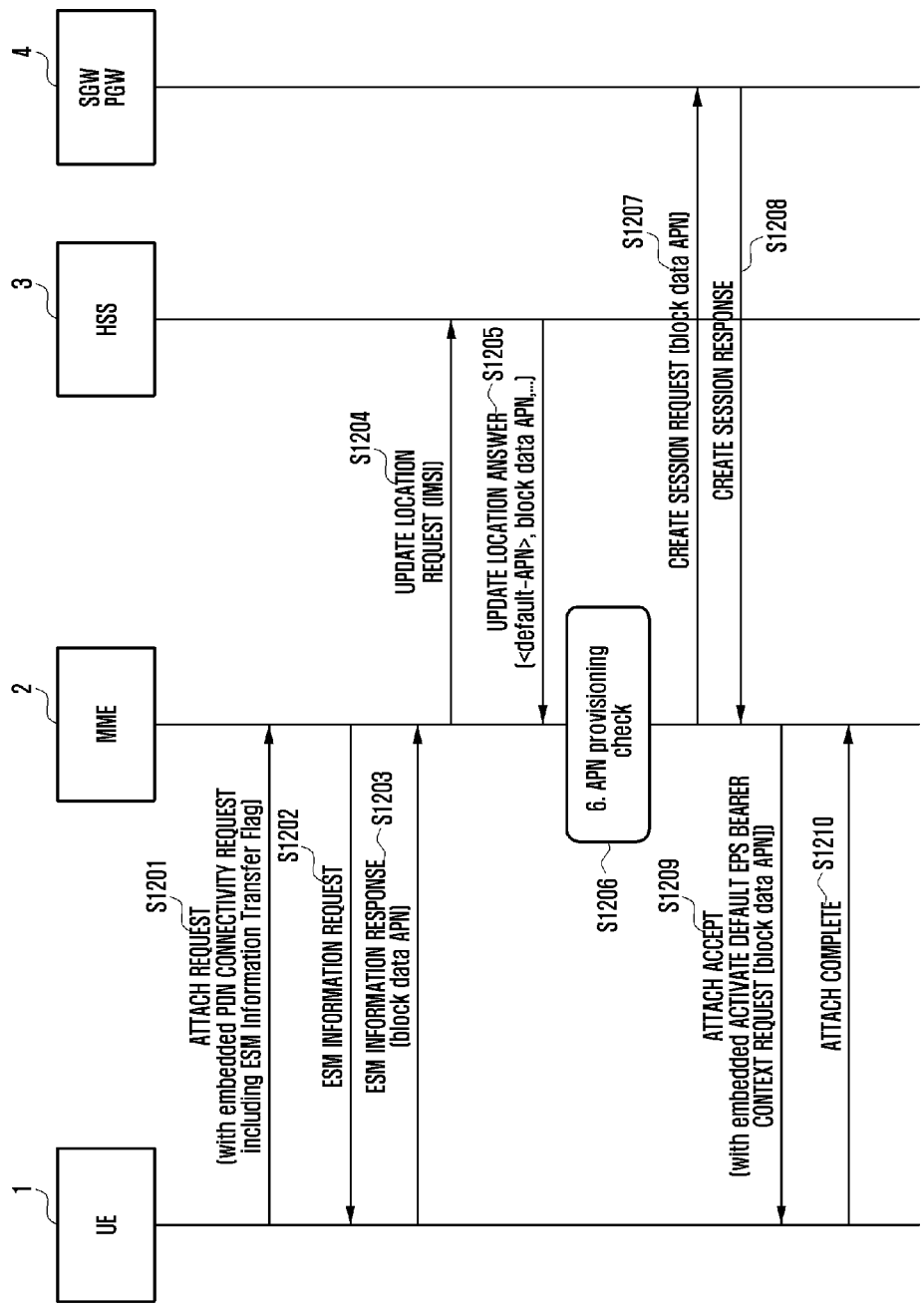
[Fig. 12]

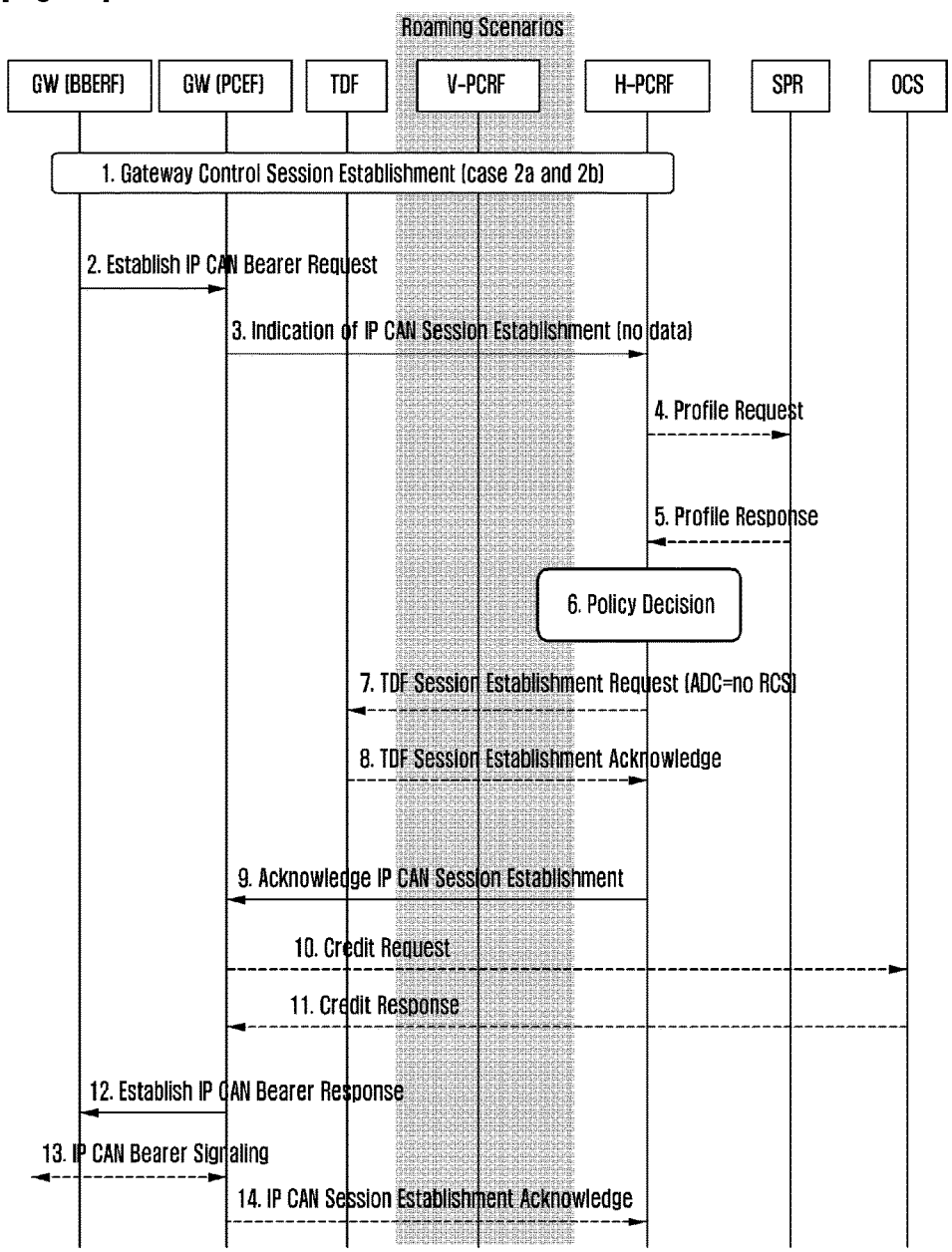

US 10,009,953 B2

CONTROLLING DATA TRANSMISSION BETWEEN A USER EQUIPMENT AND A PACKET DATA NETWORK

CROSS-REFERENCE TO RELATED APPLICATION(S)

The present application claims priority under 35 U.S.C. § 365 to International Patent Application No. PCT/KR2012/006004 filed Jul. 27, 2012, entitled "CONTROLLING DATA TRANSMISSION BETWEEN A USER EQUIPMENT AND A PACKET DATA NETWORK". International Patent Application No. PCT/KR2012/006004 claims priority under 35 U.S.C. § 365 and/or 35 U.S.C. § 119(a) to British Patent Application No. 1112928.5 filed Jul. 27, 2011 and which are incorporated herein by reference into the present disclosure as if fully set forth herein.

TECHNICAL FIELD

The present invention relates to the control of transmission of user data between a user equipment and a packet data network, in particular where the transmission takes place via a packet switched data network including a core network.

BACKGROUND ART

Communications systems such as wireless communications systems comprising wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation (3G) standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

LTE is designed as a high speed packet switched network, and voice and SMS services are provided as packet switched services such as Voice over Internet Protocol Multimedia Subsystem (VoIMS) and SMS over IMS (typically referred to as SMSoIP), whereas previous generation systems such as UMTS support voice and SMS services that are primarily circuit switched. Therefore, for LTE, both data and voice services are provided by a packet switched network, and a circuit switched connection is generally not available. The packet switched network is typically "always on", so that following a successful initial attachment, a UE remains connected to one or more packet switched data networks.

It is sometimes desirable to inhibit or prevent transmission of some or all types of user data to and from the user equipment. For example, in 2G and 3G networks, the user is often provided with the option of disabling (by e.g. altering a setting on his or her UE) transmission of all types of user data other than voice and SMS data; in particular, voice and SMS user data are often subject to charges which are different from (typically lower than) charges for other types of user data. This may be particularly useful in situations in which the UE is "roaming" i.e. connected to a visited network, in which higher charges may apply than when the UE is connected to its home network.

However, it is not straightforward to inhibit transmission of user data in packet switched networks such as LTE, since, as described above, it is designed as an "always on" connection. In particular, it is not straightforward to distinguish between different types of data since, in LTE, all data is transmitted according to a packet-switched method.

It is an object of the invention to at least mitigate some of the problems with the prior art systems.

DISCLOSURE OF INVENTION

Technical Problem

It is not straightforward to inhibit transmission of user data in packet switched networks such as LTE, since, as described above, it is designed as an "always on" connection. In particular, it is not straightforward to distinguish between different types of data since, in LTE, all data is transmitted according to a packet-switched method.

Solution to Problem

In accordance with a first aspect, there is provided a method of controlling user data transmission between a user equipment and one or more packet data networks (PDN) via a packet switched data network including a core network, the core network including one or more gateways, each said gateway being communicatively coupled to at least one said packet data network (PDN), the method comprising:

forming an association between the user equipment and said one or more gateways, the association enabling transmission of user data between the user equipment and the one or more packet data networks (PDN) via the one or more gateways;

sending one or more messages to the user equipment indicating one or more parameters defining data transmission characteristics of user data that may be transmitted between said one or more gateways and the user equipment;

sending one or more messages to the user equipment indicating a capability of said one or more gateways to inhibit transmission of said user data towards said user equipment;

receiving an indication from the user equipment to inhibit transmission of said user data to the user equipment from a first said gateway;

inhibiting transmission of said user data towards said user equipment from said first gateway, in response to receipt of said indication.

Since the user equipment is thus informed of the transmission characteristics of user data that may be transmitted between the one or more gateways, and also if the one or more gateways have the capability to inhibit transmission of user data towards the user equipment, a decision can be made by the user equipment and/or a user thereof to inhibit transmission of user data.

In one embodiment, inhibition of transmission of said user data is based on a predefined rule stored in said first gateway. In one embodiment, the user data comprises a first type of data and a second, different, type of data, and said rule is a rule to selectively inhibit transmission of either said first type or said second type of user data. These features enable a distinction to be made regarding transmission of different types of user data.

In one embodiment, the first type of user data comprises voice and/or SMS data. Thus, a distinction between voice/SMS and other types of data can be made; for example, transmission of voice/SMS may be allowed (i.e. not inhibited), whilst transmission of other types of data is inhibited (for example, prevented or blocked), emulating a capability of 2G and 3G systems, as described above.

In one embodiment, the first gateway is communicatively coupled to a first packet data network (PDN) which is arranged to transmit said first type of user data, and said predefined rule is a rule to inhibit transmission of all user data of said second type from said first gateway to a user equipment and to allow transmission of user data of said first type from said first gateway to a user equipment.

The method may further comprise:

receiving a indication from the user equipment to inhibit transmission of said second type of user data from a second said gateway, the second gateway being communicatively coupled to a second packet data network (PDN) which is not arranged to transmit user data of said first type; and inhibiting transmission of all user data from said second gateway towards said user equipment. Different gateways may be arranged to implement different rules so as to act together to inhibit the transmission of a given type of data (e.g. non-voice/SMS), whilst allowing transmission of other types.

In one embodiment, an indication of the predefined rule is sent to a policy server, such as a Policy and Charging Rules Function (PCRF). This may enable the policy server to alter a policy, such as a charging policy.

In one embodiments, a deep packet inspection (DPI) method is used at the first gateway to identify user data of said second type. This may be particularly suitable for identifying Rich Communications Suite (RCS) data, for example.

In one embodiment, the indicator specifies one or more said transmission characteristics of user data whose transmission is to be inhibited, and the method comprises inhibiting transmission of user data in accordance therewith. This enables the user data whose transmission is to be inhibited to be selectively controlled by the user equipment.

The one or more parameters may relate to a plurality of filters associated with said first gateway for filtering transmission of user data from a said gateway to said user equipment, each said filter defining data transmission characteristics of user data that may be transmitted between the first gateway and the user equipment.

In one embodiment, the indication specifies one or more said filters, and the method comprises deactivating the one or more filters, thereby inhibiting transmission of user data having transmission characteristics corresponding to the deactivated one or more filters. This provides a convenient method of implementing selective inhibition of the transmission of user data.

In one embodiment, the method comprises:

determining whether or not said indication specifies one or more filters to be deactivated;

in the case of a determination that that indication specifies a filter to be deactivated, deactivating the specified filter, thereby inhibiting transmission of user data having transmission characteristics corresponding to the deactivated filter; and in the case of a determination that the indication does not specify a filter to be deactivated, deactivating all filters defining transmission characteristics of a given type of user data, thereby inhibiting transmission of all user data of the given type from the core network towards the user equipment.

Thus, inhibition of the transmission of data may be implemented selective in some cases, and according to a set network policy, for example, in other cases.

In accordance with a second aspect of the invention, there is provided a method of controlling user data transmission between a user equipment and one or more packet data networks (PDN) via a packet switched data network including a core network, the core network including one or more gateways, each said gateway being communicatively coupled to a said packet data network (PDN), the method comprising:

forming an association between the user equipment and said one or more gateways, the association enabling transmission of user data between the user equipment and the one or more packet data networks (PDN) via the one or more gateways;

receiving a message at the user equipment from the core network indicating one or more parameters defining data transmission characteristics of user data that may be transmitted between a first said gateway and the user equipment;

receiving a message at the user equipment indicating a capability of said first gateway to inhibit transmission of said user data to said user equipment;

sending an indication from the user equipment to inhibit transmission of said user data to the user equipment.

In one embodiment, the method comprises said user equipment determining that a serving access network is a visited network, and said indication is sent based at least in part on a determination by said user equipment that said serving access network is a visited network.

Thus, inhibition of the transmission of user data may be implemented as a default when the user device is roaming.

In one embodiment, the method comprises said user equipment receiving an indication from the core network that the association has been successfully formed, and said indication is sent from said user equipment based at least in part on receipt of said indication. This ensures that no user data is transmitted prior to the inhibition of transmission of data being implemented.

In one embodiment, the indication is sent from said user equipment based at least in part on a user input. This enables a user to control the transmission of user data to and from his or her device.

In one embodiment, the method comprises sending, in response to user input, a further indication towards said first gateway, the further indication being a indication to cease said inhibition of transmission of user data. This further enables a user to control transmission of user data.

In accordance with a third aspect of the present invention, there is provided a gateway for controlling user data transmission between a user equipment and a packet data network (PDN), the gateway being communicatively coupled to said packet data network (PDN), the gateway being arranged to:

form an association with the user equipment, the association enabling transmission of user data between the gateway and the packet data network (PDN) via the gateway;

send a message to the user equipment indicating one or more parameters defining data transmission characteristics of user data that may be transmitted between said one or more gateways and the user equipment;

send a message to the user equipment indicating a capability of the gateway to inhibit transmission of said user data towards said user equipment;

receive an indication from the user equipment to inhibit transmission of said user data towards said user equipment from said gateway; and in response to receipt of said indication, inhibiting transmission of said user data towards said user equipment from said gateway.

The gateway of the third aspect may be adapted to provide features corresponding to any of those described above in relation to the method of first aspect of the invention.

In accordance with a fourth aspect of the present invention, there is provided a user equipment for use with a packet switched data network including a core network, the user equipment being capable of receiving user data from, and sending user data to, one or more packet data networks (PDN) via said core network, the core network including one or more gateways, each said gateway being communicatively coupled to a said packet data network, the user equipment being arranged to:

form an association with said one or more gateways, the association enabling transmission of user data between the user equipment and the one or more packet data networks (PDN) via the one or more gateways;

receive a message from the core network indicating one or more parameters defining data transmission characteristics of user data that may be transmitted between a first said gateway and the user equipment;

receive a message indicating a capability of said first gateway to inhibit transmission of said user data to said user equipment;

send an indication to inhibit transmission of said user data to the user equipment.

The user equipment of the third aspect may be adapted to provide features corresponding to any of those described above in relation to the method of second aspect of the invention.

In accordance with a fifth aspect of the present invention, there is provided a method of controlling user data transmission between a user equipment and one or more packet data networks (PDN) via a packet switched data network including a core network, the core network including one or more gateways, each said gateway being communicatively coupled to said packet data network (PDN), the method comprising:

performing a association process to form an association between the user equipment and a first said gateway, thereby enabling transmission of data between the user equipment and a first said packet data network (PDN) via the first gateway;

receiving, during said association process, an indication to inhibit transmission of user data towards said user equipment, and, in response to receipt of indication to inhibit transmission of data:

sending a message to said user equipment indicating one or more parameters defining transmission characteristics of user data that may be transmitted between a first said gateway and the user equipment; and controlling transmission of user data from said first gateway towards said user equipment in accordance with said one or more predefined parameters.

This enables the core network to specify to the user equipment, in response to receiving the indication therefrom, transmission characteristics of user data that may be transmitted to and from the user equipment. By similarly controlling transmission of user data from the first gateway towards user equipment on the basis of the specified transmission characteristics, consistency between the transmissions for the first gateway and those from the user equipment can be ensured.

Further, since the indication to inhibit transmission is received during the association process, it can be ensured that no user data whose transmission is not desired is transmitted prior to the implementation of control of data transmission.

In one embodiment, the method comprises inhibiting said data transmission based on a policy. In one embodiment, said first gateway receives said indication to inhibit transmission of user data and, responsive thereto, retrieves said policy from a policy server, such as Policy and Charging Rules Function (PCRF), thereby enabling the policy used by the first gateway to be dynamically varied. Thus, a network operator, for example, may control which data is inhibited.

In accordance with a sixth aspect of the present invention, there is provided a method of controlling user data transmission between a user equipment and one or more packet data networks (PDN) via a packet switched data network comprising a core network, the core network including one or more gateways, each said gateway being communicatively coupled to said packet data network (PDN), the method comprising:

performing an association process to form an association between a first said gateway and the user equipment, thereby enabling transmission of data between the user equipment and a first said packet data network (PDN) via the first gateway;

sending, during said association process, an indication from the user equipment to the core network to inhibit transmission of said user data towards said user equipment;

receiving a message at said user equipment indicating one or more parameters defining data characteristics of user data that may be transmitted between the first gateway and the user equipment; and controlling transmission of user data of from said user equipment towards said first gateway in accordance with said one or more predefined parameters.

In one embodiment, the method comprises said user equipment determining that a serving access network is a visited network, and said indication is sent based at least in part on a determination by said user equipment that said serving access network is a visited network.

Thus, inhibition of the transmission of user data may be implemented as a default when the user device is roaming.

In one embodiment, the indication is sent from said user equipment based at least in part on a user input. This enables a user to control the transmission of user data to and from his or her device.

In accordance with a seventh aspect of the invention, there is provided a gateway for controlling user data transmission between a user equipment and a packet data network (PDN), the gateway being communicatively coupled to the packet data network (PDN), the gateway being arranged to:

perform an association process to form an association with the user equipment, thereby enabling transmission of data between the user equipment and the packet data network (PDN) via the gateway;

receive, during said association process, an indication to inhibit transmission of user data towards said user equipment, and, in response to receipt of said indication to inhibit transmission of data:

send a message to the user equipment indicating one or more parameters defining data characteristics of user data that may be transmitted between a first said gateway and the user equipment; and control transmission of user data from the first gateway towards said user equipment in accordance with the one or more predefined parameters.

The gateway of the seventh aspect may be adapted to provide features corresponding to any of those described above in relation to the method of fifth aspect of the invention.

In accordance with an eighth aspect of the present invention, there is provided a user equipment for use with a packet switched data network including a core network, the user equipment being capable of receiving user data from, and sending data to, one or more packet data networks (PDN) via said core network, the core network including one or more gateways, each said gateway being communicatively coupled to a said packet data network, the user equipment being arranged to:

perform an association process to form an association with a first said gateway and the user equipment, thereby enabling transmission of data between the user equipment and a first said packet data network (PDN) via the first gateway;

send, during said association process, an indication from the user equipment to the core network to inhibit transmission of said user data towards said user equipment;

receive a message at said user equipment indicating one or more parameters defining data characteristics of user data that may be transmitted between the first gateway and the user equipment; and control transmission of user data from said user equipment towards said first gateway in accordance with said one or more predefined parameters.

The user equipment of the eighth aspect may be adapted to provide features corresponding to any of those described above in relation to the method of sixth aspect of the invention.

In one embodiment, the user equipment is capable of sending and receiving user data of first and second types, the first type of data comprising voice and Short Message Service (SMS) data, and the second type of data being different from the first type of data, wherein said association with the first gateway enables transmission of data of the second type, and the user equipment is arranged not to form an association with a second gateway for enabling transmission of data of the second type. The user equipment may be arranged to form an association with a third gateway for enabling transmission of data of the first type. These features prevents further associations being formed which may result in the transmission of undesired user data, whilst enabling associations to be formed which enable transmission of desired user data, such as voice and SMS data.

Further features and advantages of the invention will become apparent from the following description of preferred embodiments of the invention, given by way of example only, which is made with reference to the accompanying drawings.

Advantageous Effects of Invention

In accordance with an aspect of the present invention, a user equipment is thus informed of the transmission characteristics of user data that may be transmitted between the one or more gateways, and also if the one or more gateways have the capability to inhibit transmission of user data towards the user equipment, a decision can be made by the user equipment and/or a user thereof to inhibit transmission of user data. It is an effects of the invention to at least mitigate some of the problems with the prior art systems.

BRIEF DESCRIPTION OF DRAWINGS

FIG. 1 is a flow diagram showing steps performed by a user equipment in an embodiment of the present invention;

FIG. 3 illustrates a message including an indication that a core network is capable of inhibiting transmission of data in accordance with the first embodiment of the present invention;

FIG. 4 shows details of a protocol configurations options (PCO) field of the message of FIG. 3;

FIG. 5 shows a message including an indicator that data transmission is to be inhibited according to the first embodiment of the present invention;

FIG. 6 shows details of a traffic flow aggregate field of the message of FIG. 5;

FIG. 7 shows a list of packet data filters that may be included in the traffic flow aggregate field shown in FIG. 6;

FIG. 8 is a schematic diagram illustrating data flow patterns being provided to a core network from a user device in accordance with the first embodiment of the present invention;

FIG. 9 is a sequence diagram showing steps performed by a user equipment and a core network in arranging to inhibit data transmission in accordance with a second embodiment of the present invention;

FIG. 10 shows a message including an indication that data transmission is to be inhibited in accordance with the second embodiment of the present invention;

FIG. 11 shows details of a request type field of the message of FIG. 10;

FIG. 12 is a sequence diagram showing steps performed by a user equipment and a core network in arranging to inhibit data transmission in accordance with a second embodiment of the present invention;

FIG. 13 is a sequence diagram illustrating an arrangement for performing deep packet inspection (DPI) in accordance with an embodiment of the present invention.

MODE FOR THE INVENTION

Figure 2A:
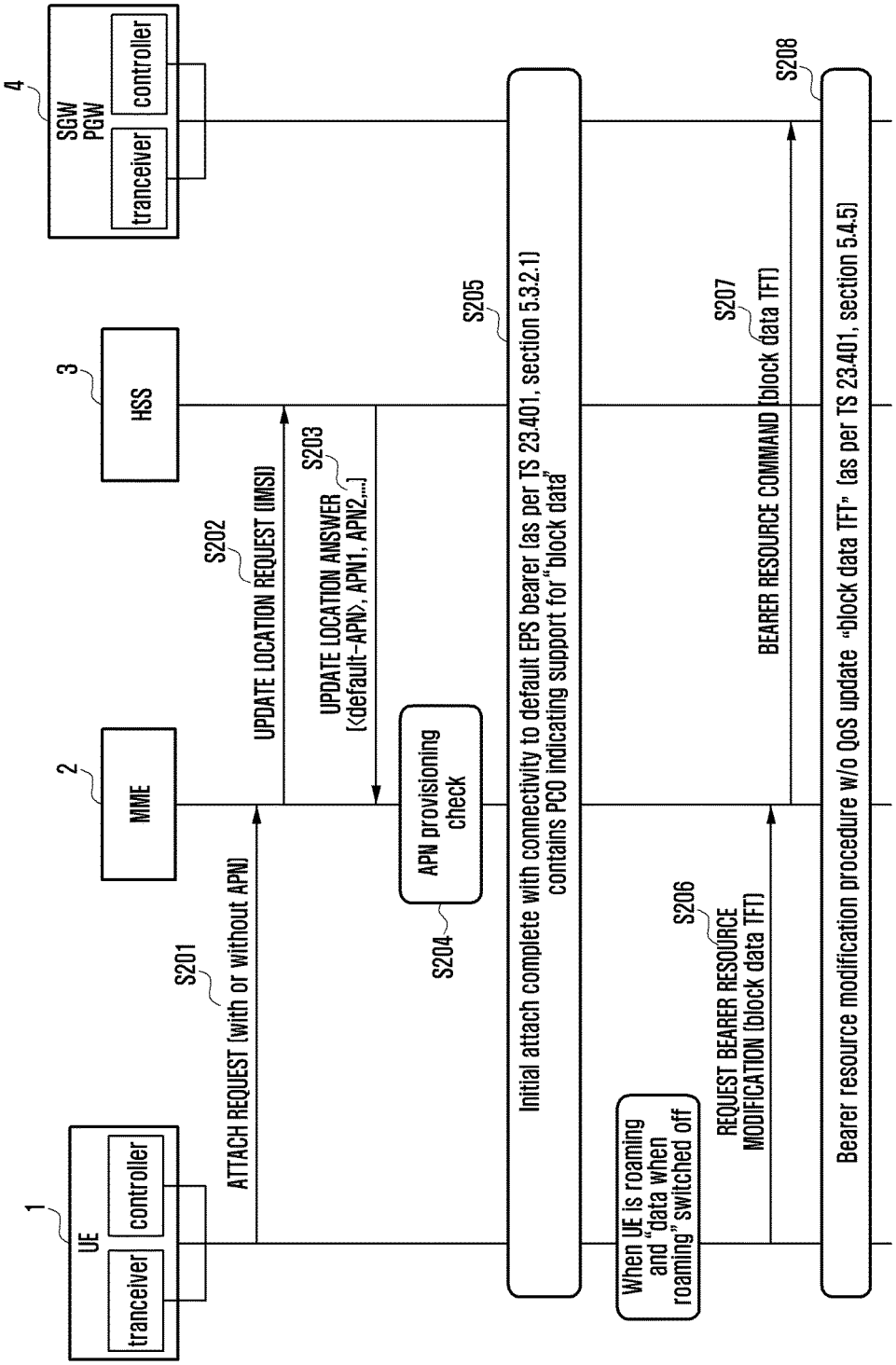
FIG. 2a is a sequence diagram showing steps performed by a user equipment and a core network in arranging to inhibit data transmission in accordance with a first embodiment of the present invention.

Embodiment of the invention will now be described in the context of a telecommunication network including an LTE Evolved Packet System (EPS) packet switched data network. However, it will be understood that this is by way of example only and that other embodiments may involve other packet switched data networks using other radio access technologies, such as IEEE802.16 WiMax.

FIG. 1 is a flow diagram of a steps performed by a UE in accordance with an embodiment of the present invention. At step S100, the UE camps in a given LTE cell; at step S102, the UE performs an attach process. The attach process, which is describe in more detail below with reference to FIG. 2, involves the UE forming an association with a core network of the LTE wireless communication system, and in particular with one or more a packet data network gateways (P-GW). The P-GWs are each communicatively coupled to one or more packet data networks (PDN), enabling the UE to receive user data from, and transmit user data to, the PDNs. Exemplary PDNs include an IMS, the internet and an intranet, such as a corporate intranet.

At step S104, the UE receives an indication from the core network that it has a "block data" capability in accordance with an embodiment of the present invention; the "block data" capability of the core network is described below. The UE stores an indication of the core network "block data" capability at step S106.

At step S108 the UE determines whether or not to adopt a "block data" configuration i.e. a configuration which transmission of some or all user data between the UE and a P-GW is inhibited. The UE may be triggered to adopt the "block data" configuration by a user input, for example a user adjusting a setting on their UE to disable user data transmission. Alternatively, or additionally, the UE may adopt a "block data" configuration in response to determining that it is roaming (i.e. that the serving network, such as a Public Land Mobile Network (PLMN) with which it is connected is a visited network by, for example, receiving a System Identification Number (SID) from the PLMN which indicates that the latter is not the home PLMN for the UE). The UE may have a default setting which specifies that a "block data" configuration is adopted whenever the UE is roaming. The UE may determine whether its settings indicate to adopt a "block data" configuration in response to receipt of a message from the core network indicating that the initial attach has been successfully completed.

If the determination at step S108 is that the "block data" configuration is not to be adopted, then the UE applies its local policy settings for sending and receiving user data at step S109, and returns to step S108.

If the determination at step S108 is that the "block data" configuration is to be adopted, the UE next determines at step S110 whether a predetermined the "block all" configuration is to be adopted, or whether a "selective blocking" configuration is to be adopted.

If it is determined at step S110 a predetermined "block all" configuration is to be adopted, then the UE sends a "block all" message to the core network at step S112. The process then proceeds to step S114, in which the UE adopts a "block all" configuration. When a "block all" configuration is adopted, transmission of all user data between the UE and the core network may be inhibited. However, in some cases transmission of some types of data may not be inhibited in the "block all" configuration; for example transmission of VoIMS and SMSoIP data may be enabled whilst the "block all" configuration is used; this will be described in detail below.

If it is determined at step S110 that the "block all" configuration is not to be adopted in relation to all user data, a "selective block" policy is implemented in which the UE specifies types of user data whose transmission is to be inhibited, whilst allowing transmission of other types of user data. For example, there may be user-adjustable setting on the UE to enable user data relating to some applications (e.g. a social networking site) to be transmitted between the UE and the core network, but not others. If the selective block policy is implemented, the UE sends, at step S116, a message to the core network including one or more parameters defining transmission characteristics of user data that may be transmitted from the core network to the UE; these parameters may relate to one or more filters. At step S118, the UE implements a selective blocking policy to allow transmission of user data having transmission characteristics defined by the parameters, and to block data transmission from the UE of user data having other transmission characteristics.

FIG. 2a is a sequence diagram showing communications between a UE 1, and core network components in controlling data transmission in accordance with an embodiment of the present invention. The core network components include a control node such as a Mobile Management Entity (MME) 2, a subscriber database such as a Home Subscriber Server (HSS) 3 and a gateway such as a PDN gateway (P-GW) 4, which may be co-located with a serving gateway (S-GW).

Communication between the UE 1 and the core network may be performed via a Radio Access Network (RAN), including one or more wireless base stations, such as an eNodeB (eNB), as referred to in the LTE standards.

In steps S201 to S205, the UE 1 and the core network perform an attach process, as described above in relation to FIG. 1. During the attach process, an association is formed between the UE 1 and the P-GW 4, in the form of a default EPS bearer which is characterised in part by parameters such as a filter specification, known as a traffic flow template (TFT), which specifies transmission characteristics of user data transmission that is allowed between the UE 1 and the P-GW 4. The transmission characteristics may include IP addresses, port numbers and/or a protocol associated with transmission of user data between the end points of the data transmission to which the default EPS bearer relates. A TFT is communicated from P-GW 4 to the UE 1 during the attach process.

Although only one P-GW 4 is shown in FIG. 2a, as described above, the UE 1 may simultaneously attach to more than one P-GW 4, each of which may be communicatively coupled to a different PDN. The PDN or PDNs to which the UE 1 attaches are each defined by an identifier, such as an Access Point Names (APN). The attach request sent to the core network by the UE 1 at step S201 may include one or more APNs, or one or more default APNs may be provided by the HSS 3 in response to the attach request (c.f. steps S202 and S203).

As part of the attach process, the UE 1 receives a message from the P-GW 4 indicating that the core network has a "block data" capability in accordance with an embodiment of the present invention. FIG. 3 shows an exemplary message 300, in which the indication of the "block data" capability is included in the protocol configuration options (PCO) field 302 of the message 300. FIG. 4 shows an exemplary PCO parameters list of the PCO field, which includes a "block data" parameter 400, indicating that the core network is capable of implementing a "block data" configuration.

In the example of FIG. 2a, the UE 1 implements a "block data" configuration in response to determining that is roaming, and a "data when roaming" setting on the UE 1 is switched off. However, it will be understood that, in some embodiments, a "block data" configuration may be implemented in response to another event, for example the user adjusting a setting on the UE 1.

As described above with reference to FIG. 1, once the UE 1 is triggered to implement a "block data" configuration, it sends at step 206 a message to the core network, such as a "bearer resource modification" request message, including an indication to implement a "block data" configuration in the core network. This message is received at the MME 2, which in turn sends a "bearer resource command", indicating that a "block data" configuration is to be implanted, to the P-GW 4, at step S207. A bearer resource modification procedure is then performed at step S208 to modify the TFT used for the default EPS bearer.

FIG. 5 shows an exemplary "bearer resource modification request" message 500, which includes a traffic flow aggregate information element 502. Details of this information element 502 are shown in FIG. 6; in particular, it includes a TFT operation code field 600 having a value ("111" in the example of FIG. 6) which indicates to the core network that a "block data" configuration is to be implemented, and a packet filter list field 602.

The information element 502 is sent to the P-GW 4 as part of the bearer resource command sent at step S207. The P-GW 4 may interpret the block data 502 element in different ways, depending on whether or not the packet filter list field 602 is empty.

We first consider the case in which the packet filter list field 602 is empty. In this case, the P-GW 4 adopts a "block all" configuration and implements a predefined rule, or policy, stored at the P-GW 4; the message 500 in this case corresponds to the "block all" message described above with reference to step S112 of FIG. 1. The predefined rule may be to block all user data, so that all user data transmission towards the UE 1 from the P-GW 4 is inhibited; this may be the case if the PDN with which the P-GW 4 is coupled is one that does not provide VoIMS or SMSoIP user data, for example if the PDN is a company intranet. Alternatively, the predefined rule may be to block only predefined types of user data, so that transmission of only user data of the predefined types towards the UE 1 from the P-GW 4 is inhibited; for example, if the PDN with which the P-GW 4 is coupled is one that provides VoIMS and/or SMSoIP user data, the P-GW 4 may allow transmission of VoIMS/SMSoIP data, whilst inhibiting transmission of all other types of data.

We now turn to the case in which the packet filter list field 602 is not empty; in this case a "selective blocking" configuration is adopted, and the message 500 corresponds to that described above with reference to step S116 of FIG. 1. FIG. 7 shows an exemplary list of packet filters which may be included in the packet filter list field 602. The P-GW 4 interprets this list as a list of packet filters in the existing TFT for the default EPS bearer which are to be deactivated, so that transmission towards the UE 1 of user data having transmission characteristics defined by the listed packet filters is inhibited. This enables the UE 1 to specify (in accordance with a user-defined setting, for example) types of user data whose transmission is to be inhibited.

Although, in the example described above, the value in the TFT operation code field 600 was assumed to be the same whether or not the packet filter list field 602 is empty, in some embodiments a different value is used when the packet filter list field 602 is empty to the value used to when the packet filter list field is not empty.

Although not shown in FIG. 2a, the P-GW 4 may contact a policy server, such as a Policy Charging and Rules Function (PCRF) to indicate that a "block data" configuration is being implemented. This may enable an update to, for example, a charging policy.

Various methods may be used to differentiate between different types of user data at the UE 1, and at the P-GW 4. We first consider the UE 1. The UE 1 may have one or more internal interface, such as an application programming interface (API) which differentiates between different types of user data, according to, for example, the application to which the type of user data relates. For example, the UE 1 may allow transmission of user data which is used by an application that uses VoIMS and/or SMSoIP, but inhibit transmission of user data by applications which use other types of user data.

Alternatively, or additionally, the UE 1 may define different transmission characteristics of data for different types of data, and filter accordingly. For example, in the case of an IMS APN (i.e. in the case that an association is formed between the UE 1 and a P-GW 4 communicatively coupled with an IMS), the UE 1 may define a different IMS flows for VoIMS/SMSoIP than for non-VoIMS/SMSoIP data. These IMS flows could be defined as follows:

Flow 1: (IP address UE 1, port_A)<- ->(IP address P-CSCF, port_C) over TCP;

Flow 2: (IP address UE 1, port_B)<- ->(IP address P-CSCF, port_D) over TCP;

The UE 1 could thus use Flow 1 for VoIMS/SMSoIP, and Flow 2 for non-VoIMS/SMSoIP; by applying filters that allow transmission of user data from port_A on the UE 1 side to port_C on a Proxy Call Session Control Function (P-CSCF) (the destination of the transmission in the IMS), but not from port_B on the UE 1 side to port_D on the P-CSCF side, it is thus possible to allow voice calls and SMS messages to be sent, whilst preventing other types of user data transmission. Alternatively, or additionally, different IP addresses and/or protocols could be used to distinguish between different types of user data. For example, the P-CSFC could be arranged to allocate different IP addresses on IMS registration, so that the IP address used for VoIMS/SMS is different from that used for non-VoIMS/SMSoIP; flow 1 could then specify the IP address for the former, and flow 2 the IP address for the latter. In another example, flow 1 could specify TCP as the transport protocol, with flow 2 specifying UDP.

The P-GW 4 may similarly apply packet filters to distinguish different types of user data. As described above, the user may include a list of packet filters in the packet filter field 602 in the "bearer resource modification" request message including the indication implement a "block data" configuration. This enables the UE 1 to selectively control the user data that it transmitted towards the UE 1 from the P-GW 4, as well as the user data that is transmitted towards the P-GW 4 from the UE 1.

In some embodiments, the P-GW 4 stores predefined data flows (such as IMS data flows) corresponding to those used by the UE 1 as described above, so that a predefined packet filters can be deactivated to inhibit transmission of predefined types of user data. Alternatively, or additionally, the UE 1 may be arranged to create and send data flows to the P-GW 4. For example, as shown in FIG. 8, the data flows may be sent initially to a P-CSFC 5 by the UE 1 as part of a message, such as a SIP register message; the data flows are then sent to a Policy Charging and Rules Function (PCRF) 6 as part of a message, for example a Rx message, and subsequently to the P-GW 4 as part of a message, for example a Gx message. Thus, when implementing a "block data" configuration, the UE 1 may first send the data flows to the P-GW 4 as described above with reference to FIG. 8, and subsequently send a "block data" message, as described above, including a list of one or more packet data filters that are to be deactivated at the P-GW 4. In this way, the UE 1 may define arbitrary types of user data whose data transmission is to be inhibited. This enables the user-adjustable setting described above with reference to FIG. 1 to be implemented; a traffic flow can be created specifically for any type of user data whose receipt at the P-GW 4 the user wishes to inhibit (or allow).

Alternatively, or additionally, to using packet filters, the P-GW 4 may use another method, such as a deep packet inspection (DPI) method to distinguish between, and inhibit transmission of, different types of user data.

Figure 2B:
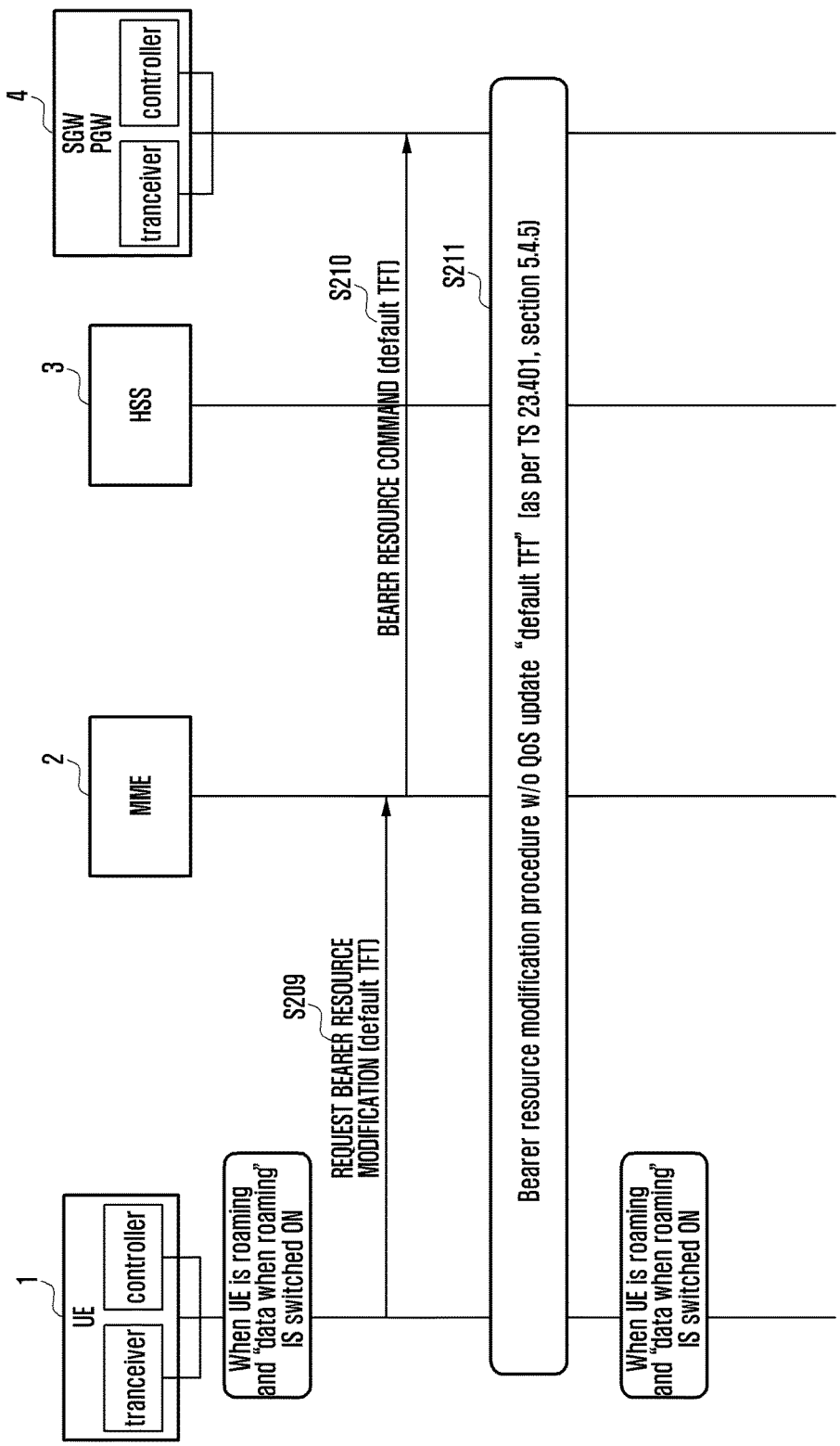
FIG. 2b is a sequence diagram showing steps performed by a user equipment and a core network in ceasing inhibition of data in accordance with the first embodiment of the present invention.

FIG. 2b shows a process that may be implemented when the "block data" configuration is to be cancelled; as shown, this may be triggered by the user of the UE 1 adjusting a setting on the UE 1 to enable connectivity with respect to the user data whose transmission was inhibited in the "block data" configuration. At step S209, the UE 1 sends a "bearer resource modification" message to the MME 2 indicating that the default TFT (i.e. the TFT that was initially transmitted to the UE 1 from the P-GW 4 during the attach process) is to be used. The MME 2 then sends a "bearer resource command" message, also indicating that the default TFT is be used, to the P-GW 4 at step S210; a procedure is then performed at step S211 to restore the default TFT at the P-GW 4. Similarly, the default TFT is implemented at the UE 1, so that transmission of all user data allowed by the TFT is enabled in both directions between the UE 1 and the P-GW 4.

The processes described above relate to the default EPS bearer that is established between the UE 1 and the P-GW 4. In the case that one or more dedicated bearers also exist between the UE 1 and the P-GW 4 at the time that the "block data" configuration is implemented by the UE 1, corresponding processes are also preferably implemented in relation to the one or more dedicated EPS bearers, to ensure that transmission of user data whose transmission is inhibited in the default EPS bearer is also inhibited in the one or more dedicated EPS bearers. Further, a policy stored in the P-GW 4 may specify that any dedicated EPS bearer initiated by the P-GW 4 during implementation of a "block data" configuration must inhibit transmission of the types of user data that are inhibited in the default EPS bearer.

In the embodiments described above with reference to FIG. 1 to FIG. 8, a message indicating that data transmission is to be inhibited is sent subsequently to completion of the attach process. However, in some embodiments, an indication that data transmission towards the UE 1 is to be inhibited is sent to the P-GW 4 as part of the attach process; the sending of the message may be conditional on the UE 1 making a determination, prior to initiating the attach process, that it has been set to implement a "block data" configuration and/or making a determination that it is roaming.

FIG. 9 illustrates an exemplary process in which the indication is included in an attach request sent from the UE 1. The UE 1 sends an attach request at step S901, which includes the indication, in the form of a "block data" flag. As described above with reference to FIG. 2a, the attach request may optionally include an APN, or an APN may instead be retrieved from the HSS 3 (c.f. steps S902 and S903). After completing an APN provisioning check at step S904, the MME 2 sends a create session request including the block data flag at step S905.

FIG. 10 shows an exemplary "attach request" message, which includes a "request type" information element 1000, details of which are shown in FIG. 11. As can be seen in FIG. 11, the request type includes a value 1100 indicating that a "block data" configuration is to be implemented.

Returning to FIG. 9, at step S906 the P-GW 4 retrieves a policy for implementing the "block data" configuration from a policy server, such a PCRF 6. As shown in FIG. 9, this retrieval may be performed as part of a process to establish an IP Connectivity Access Network (IP-CAN) Session with the PCRF 6. As with the policy described above with reference to FIG. 2a, the retrieved policy may define how the block data indication is to be interpreted; this policy may depend on the APN to which the P-GW 4 corresponds. For example, in the case of an IMS APN, the policy may be to allow VoIMS/SMSoIP data transmission, but to inhibit transmission of other types of data, for example; in the case of an internet APN, the policy may be to inhibit transmission of all user data, for example.

Based on the retrieved policy, at step S907 the P-GW 4 sends a message at towards the UE 1 including one or more parameters defining transmission characteristics of user data that may be transmitted between the P-GW 4 and the UE 1; the one or more parameters may be provided as a TFT, and the message in which one or more parameter are included may be a "create session response" message, which is sent from the P-GW 4 to the MME 2. The one or more parameters are subsequently sent from the MME 2 to the UE 1 at step S908, as part of an "attach accept" message. The UE 1 then completes the attach process by sending an "attach complete" message to the MME 2 at step S909.

The P-GW 4 and UE 1 may then each implement a block data policy to control transmission of user data, by inhibiting transmission of some or all user data on the basis of the one or more parameters sent to the UE 1; this may be done using, for example a method as described above using packet filters, an API and/or a DPI method.

When a "block data" configuration is to be cancelled, the procedure described above in relation to FIG. 2b may be used to set the TFT for the bearer to default TFT. Alternatively, a Tracking Area Update (TAU) or Service Request (SR) could be used.

In this embodiment, types of user data whose transmission is inhibited in a "block data" configuration are determined by a policy of the core network. In the example described above, this policy is retrieved from a policy server such as a PCRF 6; this enables the policy to be dynamically varied, for example by a network operator, by changing the policy stored in the PCRF 6. However, in some embodiments, a policy may instead by stored at the P-GW 4, with no retrieval from the PCRF 6 being performed; in this case, the P-GW 4 may contact the PCRF 6 to indicate the policy being used, so that that the PCRF 6 can update, for example, a charging policy.

A further embodiment in which the indicator to inhibit transmission of data is sent by the UE 1 during an attach process is illustrated in FIG. 12. In this example, the indicator is not included in the initial attach request; instead, the attach request sent at step S1201 to the MME is embedded with a PDN connectivity request including a EPS Session Management (ESM) information transfer flag. The MME 2 sends an ESM information request at step S1202 to the UE 1, and the UE 1 responds with an ESM information response message at step S1203, this latter message including an indicator to inhibit transmission of user data from the P-GW 4 towards the UE 1, the indicator in this case identifying of an APN, herein referred to as a "block data" APN. The block data APN may be a standardised or well-known APN, which defines transmission characteristics of types of user data whose transmission between UE 1 and the P-GW 4 is to be inhibited.

After performing an update location procedure with the HSS 3 (steps S1202 and S1203) and an APN provisioning check at step S1207, the MME 2 sends a message, for example a "create session request" message, including the identifier of the block data APN, to the P-GW 4. The P-GW 4 responds with a message, such as a "create session response" message, to the MME 2 which confirms that the block data APN is to be implemented. The MME 2 then sends a message to the UE 1 confirming that the block data APN is to be used at step S1209; the message may be an "attach accept" message having an embedded "activate default EPS bearer context request". Although not shown in FIG. 12, the P-GW 4 also sends one or more parameters to the UE 1 defining data transmission characteristics of user data that may be transmitted between the P-GW 4 and the UE 1; these parameters are typically provided as a TFT, as described above. The UE 1 then completes the attach process by sending an "attach complete" message at step S1210.

In this embodiment, the types of data whose data transmission is to be inhibited are defined by the APN in use. The APN may thus identify a P-GW 4 communicatively coupled to an IMS, but which uses, for example, packet filters and/or a DPI method described above, to inhibit transmission of, for example, all non-VoIMS/SMSoIP user data. In another example, the APN may identify a P-GW 4 coupled to a PDN, but which inhibits transmission of all user data towards the UE 1.

The UE 1 may similarly inhibit transmission of some or all types of user data towards the P-GW 4 using, for example, an API and/or a packet filter method as described above.

In this embodiment the UE 1 may be arranged such that, once the block data APN is implemented, the UE 1 may not connect to a further P-GW 4 (i.e. may not implement a further APN) which allows transmission of types of user data whose transmission is inhibited for the block data APN. For example, if in the "block data" APN, the transmission of e-mail data is inhibited, then the UE 1 may be arranged not to attach to a P-GW 4 which allows transmission of e-mail data.

Additionally or alternatively, the UE 1 may be arranged such that, where the P-GW 4 for the block all data APN is communicatively coupled to a PDN which does not transmit certain types of data, the UE 1 may attach to a P-GW 4 which does transmit those types of data. For example, if the PDN for the block data APN does not provide VoIMS data, the APN may be arranged such that it may attach to a P-GW 4 coupled to a PDN which does provide VoIMS, for example when the UE 1 initiates a voice call.

In this example, when the "block data" configuration is to be cancelled, the association between the UE 1 and the P-GW 4 may be terminated, for example by an APN tear down initiated by the UE 1 sending a tear down indicator. The UE 1 may then re-attach to the core network using a different APN, for example an APN in which transmission of user data is not blocked.

In the embodiments described above with reference to FIG. 9 to FIG. 12, the default EPS bearer is implemented in accordance with the "block data" configuration during the attach process; accordingly, the P-GW 4 may have a policy that any dedicated EPS bearers which are initiated during implementation of a block data configuration must inhibit transmission of the types of user data that are inhibited in the default EPS bearer.

As mentioned above, in some embodiments of the present invention, the core network may use a DPI method to identify different types of user data. This may be particularly useful for identifying Rich Communications Suite (RCS) data. The DPI method may be implemented using a Traffic Detection Function (TDF), as illustrated in FIG. 13; the TDF may co-locate with a Policy and Charging and Enforcement Function (PCEF) on the P-GW 4, or it may be standalone.

In embodiments of the present invention, the UE 1 may be a mobile device capable of accessing an LTE network, such as smart phone, personal digital assistant (PDA), laptop computer or tablet computer. In some embodiments, the UE 1 is an IMS device, capable of making VoIMS calls and sending SMSoIP via an IMS. In other embodiments, the UE 1 is a Circuit Switch Fallback (CSFB) device, which connects to a circuit-switched network for performing voice calls and sending SMS, but connects to an EPS for sending and receiving other types of user data. In still other embodiments, the UE 1 may be a device that is not capable of making voice calls but is capable of sending/receiving SMS messages, such as a "data dongle" or a laptop computer.

The UE 1 typically includes one or more communications interfaces, such as radio transceivers for communicating with the LTE wireless communication system, and a processor or set of processors for performing the steps described above in conjunction, where appropriate, with a data storage device. The processor or processors may be arranged to execute a computer program which causes the UE 1 to perform the steps described above.

Each of the components of the core network described above, such as the P-GW 4, may be implemented as a combination of hardware and software components and may comprise one or more communications interfaces for sending and receiving data, and one or more processors for performing the steps described above. The processor or processors may be arranged to execute a computer program which causes the P-GW 4, or other component, to execute the steps described above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of controlling user data transmission between a user equipment (UE) and one or more packet data networks (PDNs) via a packet switched data network including a core network, the core network including one or more gateways, each of the one or more gateways being communicatively coupled to at least one of the one or more PDNs, the method comprising:

establishing, by at least one of the one or more gateways, a connection between the user equipment and the one or more gateways, the connection enabling transmission of user data between the user equipment and the one or more PDNs via the one or more gateways;

transmitting, by the at least one gateway, one or more messages to the user equipment indicating one or more parameters defining data transmission characteristics of user data to be transmitted between the one or more gateways and the user equipment;

transmitting, by the at least one gateway, one or more messages to the user equipment indicating a capability of the one or more gateways to block transmission of the user data towards the user equipment;

receiving, by the at least one gateway, an indication and a packet filter list from the user equipment to block transmission of the user data to the user equipment from a first of the one or more gateways; and blocking, by the at least one gateway, transmission of the user data towards the user equipment from the first gateway based on a policy associated with an Access Point Name (APN) corresponding to the at least one gateway, the packet filter list and the data transmission characteristics of the user data, in response to receipt of the indication.

2. The method according to claim 1, wherein the blocking of transmission of the user data is based on a predefined rule stored in the first gateway and the user data comprises a first type of data and a second type of data, and the predefined rule includes a first rule to selectively block transmission of either the first type or the second type of user data.

3. The method according to claim 2, wherein the first at least one gateway is communicatively coupled to a first PDN which is arranged to transmit the first type of user data, and the predefined rule includes a second rule to block transmission of all user data of the second type from the first gateway to the user equipment and to allow transmission of user data of the first type from the first gateway to the user equipment.

4. The method according to claim 3, further comprising:
receiving an indication from the user equipment to block transmission of the second type of user data from a second of the one or more gateways, the second gateway being communicatively coupled to a second PDN which is not arranged to transmit user data of the first type; and
blocking transmission of all user data from the second gateway towards the user equipment.

5. The method according to claim 1, wherein the indication specifies one or more of the data transmission characteristics of user data whose transmission is to be blocked, and the method further comprises blocking transmission of user data in accordance therewith.

6. A method of controlling user data transmission between a user equipment and one or more packet data networks (PDNs) via a packet switched data network including a core network, the core network including one or more gateways, each of the one or more gateways being communicatively coupled to at least one of the one or more PDNs, the method comprising:
establishing, by the user equipment, a connection between the user equipment and the one or more gateways, the connection enabling transmission of user data between the user equipment and the one or more PDNs via the one or more gateways;
receiving, by the user equipment, a first message at the user equipment from the core network indicating one or more parameters defining data transmission characteristics of user data to be transmitted between a first of the one or more gateways and the user equipment;
receiving, by the user equipment, a second message at the user equipment indicating a capability of the first gateway to block transmission of the user data to the user equipment; and
transmitting, by the user equipment, an indication and a packet filter list from the user equipment to block transmission of the user data to the user equipment, wherein the user data is blocked based on a policy associated with an Access Point Name (APN) corresponding to the first gateway, the packet filter list and the data transmission characteristics of the user data in response to receipt of the indication.

7. The method according to claim 6, further comprising the user equipment determining that a serving access network is a visited network, wherein the indication is sent based at least in part on a determination by the user equipment that the serving access network is a visited network.

8. The method according to claim 6, further comprising the user equipment receiving an indication from the core network that the connection has been successfully established, wherein the indication to block transmission of the user data to the user equipment is sent from the user equipment based at least in part on receipt of the indication that the connection has been successfully established.

9. A gateway for controlling user data transmission between a user equipment and a packet data network (PDN), the gateway being communicatively coupled to the PDN, the gateway comprising:
a transceiver configured to transmit and receive a signal; and
a controller coupled to the transceiver and configured to:
establish a connection with the user equipment, the connection enabling transmission of user data between the gateway and the PDN via the gateway;
transmit a first message to the user equipment indicating one or more parameters defining data transmission characteristics of user data to be transmitted between the gateway and the user equipment;
transmit a second message to the user equipment indicating a capability of the gateway to block transmission of the user data towards the user equipment;
receive an indication and a packet filter list from the user equipment to block transmission of the user data towards the user equipment from the gateway; and
blocking transmission of the user data towards the user equipment from the gateway based on a policy associated with an Access Point Name (APN) corresponding to the gateway, the packet filter list and the data transmission characteristics of the user data, in response to receipt of the indication.

10. A user equipment for use with a packet switched data network including a core network, the user equipment being capable of receiving user data from, and transmitting user data to, one or more packet data networks (PDNs) via the core network, the core network including one or more gateways, each of the one or more gateways being communicatively coupled to at least one of the one or more PDNs, the user equipment comprising:
a transceiver configured to transmit and receive a signal; and
a controller coupled to the transceiver and configured to:
establish a connection with the one or more gateways, the connection enabling transmission of user data between the user equipment and the one or more PDNs via the one or more gateways;
receive a first message from the core network indicating one or more parameters defining data transmission characteristics of user data to be transmitted between a first of the one or more gateways and the user equipment;
receive a second message indicating a capability of the first gateway to block transmission of the user data to the user equipment; and
transmit an indication to block transmission of the user data to the user equipment and a packet filter list, wherein the user data is blocked based on a policy associated with an Access Point Name (APN) corresponding to the first gateway, the packet filter list and the data transmission characteristics of the user data in response to receipt of the indication.

11. A method of controlling user data transmission between a user equipment and one or more packet data networks (PDNs) via a packet switched data network including a core network, the core network including one or more gateways, each of the one or more gateways being communicatively coupled to at least one of the one or more PDNs, the method comprising:
- establishing, by a first of the one or more gateways, a connection between the user equipment and the first gateway, thereby enabling transmission of data between the user equipment and a first of the one or more PDNs via the first gateway;
- receiving, by the first gateway, during establishment of the connection, a packet filter list and an indication to block transmission of user data towards the user equipment, and
- in response to receipt of the indication to block transmission of data:
  - transmitting, by the first gateway, a message to the user equipment indicating one or more parameters defining transmission characteristics of user data to be transmitted between the first gateway and the user equipment; and
  - controlling, by the first gateway, transmission of user data from the first gateway towards the user equipment in accordance with the one or more parameters,
- wherein user data is blocked based on a policy associated with an Access Point Name (APN) corresponding to the first gateway, the packet filter list and the transmission characteristics of the user data.

12. The method according to claim 11, comprising receiving the indication to block transmission of data as part of a request message from the user equipment requesting establishment of the connection.

13. The method according to claim 11, wherein the blocking of data transmission is based on a policy and the first gateway receives the indication to block transmission of user data and, responsive thereto, retrieves the policy from a policy server, thereby enabling the policy used by the first gateway to be dynamically varied.

14. The method according to claim 11, comprising receiving a further indication from the user equipment, the further indication being an indication to cease the controlling of transmission of user data, and, responsive thereto, ceasing the controlling of transmission of data.

15. A method of controlling user data transmission between a user equipment and one or more packet data networks (PDNs) via a packet switched data network comprising a core network, the core network including one or more gateways, each of the one or more gateways being communicatively coupled to at least one of the one or more PDNs, the method comprising:
- establishing, by the user equipment, a connection between a first of the one or more gateways and the user equipment, thereby enabling transmission of data between the user equipment and a first of the one or more PDNs via the first gateway;
- transmitting, by the user equipment, during establishment of the connection, a packet filter list and an indication from the user equipment to the core network to block transmission of the user data towards the user equipment;
- receiving, by the user equipment, a message at the user equipment indicating one or more parameters defining data characteristics of user data to be transmitted between the first gateway and the user equipment; and
- controlling, by the user equipment, transmission of user data from the user equipment towards the first gateway in accordance with the one or more parameters,
- wherein user data is blocked based on a policy associated with an Access Point Name (APN) corresponding to the first gateway, the packet filter list and the data characteristics of the user data.

16. The method according to claim 15, further comprising transmitting the indication from the user equipment based at least in part on a user input.

17. The method according to claim 15, wherein the indication is included in a request message requesting establishment of the connection and the request message includes an indication of a predefined APN for which data transmission is blocked.

18. A gateway for controlling user data transmission between a user equipment and a packet data network (PDN), the gateway being communicatively coupled to the packet data network (PDN), the gateway comprising:
- a transceiver configured to transmit and receive a signal; and
- a controller coupled to the transceiver and configured to:
  - establish a connection with the user equipment, thereby enabling transmission of data between the user equipment and the PDN via the gateway;
  - receive, during establishment of the connection, a packet filter list and an indication to block transmission of user data towards the user equipment, and
  - in response to receipt of the indication to block transmission of data:
    - transmit a message to the user equipment indicating one or more parameters defining data characteristics of user data to be transmitted between the gateway and the user equipment; and
    - control transmission of user data from the first gateway towards the user equipment in accordance with the one or more parameters,
  - wherein user data is blocked based on a policy associated with an Access Point Name (APN) corresponding to the first gateway, the packet filter list and the data characteristics of the user data.

19. A user equipment for use with a packet switched data network including a core network, the user equipment being capable of receiving user data from, and transmitting data to, one or more packet data networks (PDNs) via the core network, the core network including one or more gateways, each of the one or more gateways being communicatively coupled to at least one of the one or more PDNs, the user equipment comprising:
- a transceiver configured to transmit and receive a signal; and
- a controller coupled to the transceiver and configured to:
  - establish a connection with a first of the one or more gateways and the user equipment, thereby enabling transmission of data between the user equipment and a first of the one or more PDNs via the first gateway;
  - transmit, during establishment of the connection, a packet filter list and an indication from the user equipment to the core network to block transmission of the user data towards the user equipment;
  - receive a message at the user equipment indicating one or more parameters defining data characteristics of user data to be transmitted between the first gateway and the user equipment; and
  - control transmission of user data from the user equipment towards the first gateway in accordance with the one or more parameters;

wherein user data is blocked based on a policy associated with an Access Point Name (APN) corresponding to the first gateway, the packet filter list and the data characteristics of the user data.

20. The user equipment according to claim 19, wherein the user equipment is capable of transmitting and receiving user data of first and second types, the first type of data comprising voice and Short Message Service (SMS) data, and the second type of data being different from the first type of data, wherein the connection with the first gateway enables transmission of data of the second type, and the user equipment is configured not to establish an connection with a second gateway for enabling transmission of data of the second type.

* * * * *